(12) United States Patent
Böhm et al.

(10) Patent No.: US 7,059,651 B2
(45) Date of Patent: Jun. 13, 2006

(54) SUNSHADE SYSTEM FOR A MOTOR VEHICLE

(75) Inventors: Horst Böhm, Frankfurt (DE); Kai Stehning, Usingen (DE); Rainer Grimm, Frankfurt (DE); Thomas Becher, Rodgau (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/782,192

(22) Filed: Feb. 19, 2004

(65) Prior Publication Data

US 2004/0160082 A1    Aug. 19, 2004

(30) Foreign Application Priority Data

Feb. 19, 2003 (DE) ................................ 103 06 951
Jun. 3, 2003 (DE) ........................... 203 08 651 U (51) Int. Cl.
    *B00J 3/00* (2006.01)
(52) U.S. Cl. .................... 296/97.11; 296/97.8; 296/214
(58) Field of Classification Search ............ 296/97.11, 296/214, 97.8, 223, 97.9, 215, 97.4, 216.03, 296/220.01, 97.1; 224/321, 326, 309, 325; 160/370.22, 370.21
    See application file for complete search history.

(56) References Cited

U.S. PATENT DOCUMENTS

| | | | |
|---|---|---|---|
| 501,674 A | 7/1893 | Burrowes | |
| 1,459,180 A * | 6/1923 | Hein | .......................... 296/97.8 |
| 4,867,220 A * | 9/1989 | Matsumoto et al. | ..... 160/84.06 |
| 5,111,866 A * | 5/1992 | Prostko | ........................ 160/90 |
| 5,269,360 A * | 12/1993 | Chen | ........................ 160/84.06 |
| 5,344,206 A * | 9/1994 | Middleton | .................. 296/97.8 |
| 5,479,979 A * | 1/1996 | Hayashiguchi | .............. 160/265 |
| 5,638,884 A * | 6/1997 | Lin | ........................ 160/370.22 |
| 5,645,119 A * | 7/1997 | Caruso | .................... 296/97.11 |
| 6,086,133 A * | 7/2000 | Alonso | ................... 160/370.22 |
| RE37,068 E * | 2/2001 | Beatty | ..................... 296/97.11 |
| 6,227,601 B1* | 5/2001 | LaFrance | ................. 296/97.11 |
| 6,536,829 B1* | 3/2003 | Schlecht et al. | ........... 296/97.8 |
| 6,547,307 B1* | 4/2003 | Schlecht et al. | ........... 296/97.8 |
| 6,598,929 B1* | 7/2003 | Schlecht et al. | ........... 296/97.8 |
| 6,634,703 B1* | 10/2003 | De Gaillard | ................ 296/214 |
| 6,669,279 B1* | 12/2003 | Messerschmidt | ........... 296/214 |
| 6,682,133 B1* | 1/2004 | Glasl | ..................... 296/216.01 |
| 6,695,381 B1* | 2/2004 | Schlecht et al. | ......... 296/97.11 |
| 6,776,211 B1* | 8/2004 | Schlecht et al. | ....... 160/370.22 |
| 6,786,539 B1* | 9/2004 | De Gaillard | ........... 296/220.01 |
| 6,840,562 B1* | 1/2005 | Schlecht et al. | ........... 296/97.8 |
| 6,874,845 B1* | 4/2005 | Engl et al. | .................. 296/214 |
| 2003/0006630 A1* | 1/2003 | Kralik et al. | ................ 296/214 |
| 2005/0051285 A1* | 3/2005 | Yano et al. | ............. 160/370.22 |

FOREIGN PATENT DOCUMENTS

| | | | |
|---|---|---|---|
| DE | 3904486 | * | 2/1989 |
| DE | 4200422 | * | 1/1992 |

(Continued)

OTHER PUBLICATIONS

European Search Report, Jun. 25, 2004.

*Primary Examiner*—Kiran B. Patel
(74) *Attorney, Agent, or Firm*—Carlson, Gaskey & Olds (57) ABSTRACT

A sunshade system for a motor vehicle has two guide rails, a front crossbar and a rear crossbar that extend between the two guide rails and are guided therein, and a flexible sunshade that is fastened to the front and rear crossbars and is guided between the two guide rails.

19 Claims, 12 Drawing Sheets

FOREIGN PATENT DOCUMENTS

| | | | |
|---|---|---|---|
| DE | 4320393 | * | 6/1993 |
| DE | 42 00 422 A1 | | 7/1993 |
| DE | 19619474 | * | 5/1996 |
| DE | 196 19 474 A1 | | 11/1997 |
| DE | 102 40 582 A1 | | 3/2004 |
| EP | 1 201 473 A2 | | 5/2002 |
| EP | 1 211 109 A1 | | 6/2002 |
| EP | 1398192 | * | 9/2003 |
| JP | 63258213 | * | 10/1988 |
| JP | 478628 | * | 3/1992 |
| JP | 08175174 | * | 7/1996 |
| JP | 8175186 | * | 8/1996 |
| JP | 200052763 | * | 2/2000 |
| WO | WO 03/058020 A1 | | 7/2003 |

* cited by examiner

SUNSHADE SYSTEM FOR A MOTOR VEHICLE

REFERENCE TO RELATED APPLICATIONS

The present invention claims the benefit of German Patent Application No. 10306951.8, filed Feb. 19, 2003, and German Patent Application No. 20308651.1, filed Jun. 3, 2003.

TECHNICAL FIELD

The invention relates to a sunshade system for a motor vehicle, in particular for a windshield.

BACKGROUND OF THE INVENTION

Sunshade systems for sliding roofs are known in the prior art. One type of sunshade system includes a rigid headliner part that is mounted for sliding movement at the inside headliner or at the roof opener system of the vehicle roof. Another type of sunshade system includes a roller blind that is received on a coiling shaft and that may be withdrawn from the shaft.

Currently known sunshade systems are not satisfactory in many applications because the roof shape and roof opening can have different configurations from vehicle to vehicle. Especially in the case of complex roof shapes or openings to be shaded whose rims are not parallel to one another, some deficits may remain when implementing existing sunshade systems. In addition, roller blinds present an additional problem regarding how to accommodate the coiling roll within the space available. Thus, current sunshade systems have definite limitations with respect to their applicability in a variety of applications.

It is therefore the object of the invention to provide a sunshade system that is suitable for variable employment in a multitude of applications.

SUMMARY OF THE INVENTION

The invention is directed to a sunshade system for a motor vehicle. The sunshade system comprises two opposing guide rails, a front crossbar and a rear crossbar that extend between the two guide rails and are guided therein, and a flexible sunshade that is fastened to the front and rear crossbars and is guided in the two guide rails. The sunshade system according to the invention combines the positive individual features currently known in rigid headliner part and roller blind sunshade systems. Because the sunshade in the invention is precisely guided along all of its edges, it may be shifted like a rigid headliner part sunshade without encountering the problems that commonly occur in a spring-loaded roller blind. Moreover, because the sunshade in the invention is flexible like a roller blind, the guide rails in the invention do not need to run in a straight line and parallel to each other; instead, the guide rails may extend in a curved and inclined direction with respect to each other to follow the roof contour without sacrificing performance.

In one embodiment of the invention, the two guide rails extend in an inclined relationship with respect to each other, and the sunshade is elastic at right angles with respect to the shifting direction as dictated by the guide rails. That is, the material of the sunshade is capable, without any further measures, of spanning the varying distance between the opposing guide rails. The sunshade itself may entirely be made of an elastic material or be made of two materials, one of which is elastic and other of which is not elastic. The elastic material is then formed as a compensating web that can maintain coverage as the distance between the guide rails changes.

If the two opposing guide rails do not extend parallel to one another, the crossbars may be formed as telescopic members to compensate for the varying guide rail distances. More particularly, each crossbar may have two laterally protruding guide arms, both of which are received in the crossbar for sliding movement therein and each of which is received in one respective guide rail. This configuration allows the varying distance between the two guide rails to be compensated in a simple manner.

In one embodiment, the two guide arms are mechanically coupled to each other and mechanically coupled to the crossbar so that the crossbar is centered in the middle between the two guide rails. To accomplish this, the invention may incorporate a gear that is rotatably fitted to the crossbar for engagement with the crossbar by a pair of tooth racks, each of which is connected to a respective one of the guide arms. As an alternative possibility, the invention may use a compensating linkage having a compensating lever that is rotatably mounted at the crossbar. A compensation provided by spring force is also conceivable. This mechanical centering ensures that the crossbar is always centrally guided between the two guide rails without requiring a great deal of additional structure.

According to one embodiment of the invention, a spacer engages the two crossbars and keeps them at a constant distance from each other. The spacer counteracts the tensile forces exerted on the two crossbars by the sunshade and ensures that the sunshade is held tightly between the two crossbars to prevent it from sagging. The spacer also transmits pressure forces between the two crossbars when, for example, the sunshade as a whole is pushed back by shifting the front crossbar.

In one embodiment, the spacer is a push-pull cable, whose flexibility is able to adapt to any desired profile of the guide rails. Each guide rail may have one cable provided therein. The two cables associated with the two guide rails are then coupled with each other so that the ends of the cables associated with the crossbars may be only be shifted jointly and in parallel. For this purpose, a coupling gear may be provided for cooperation with the two cables. Coupling the two cables in this manner ensures that the two ends of the two crossbars can not be shifted in opposite directions. This prevents the sunshade from slanting or getting jammed between the two guide rails.

The sunshade may be manually shifted in the two guide rails. In this case, the coupling gear is free to rotate. Alternatively or additionally, a drive mechanism for adjusting the sunshade may be included. In this case, an electric motor may be provided to directly engage the coupling gear.

In another embodiment, the sunshade may include a coupling shaft that extends at right angles to the shifting direction and has two gear wheels mounted thereon for joint rotation with the shaft. The gear wheels engage a cable in one of the guide rails. This structure also ensures that the two guide rails can be only shifted in a joint, simultaneous, and parallel manner.

Depending on the specific design specifications of the vehicle in which the sunshade will be used, the two guide rails may be either fitted to a vehicle roof to form a pre-assembled roof module together with the roof or fitted to an inside headliner to form a pre-assembled unit together with the sunshade system for fitting to a vehicle roof.

According to one embodiment of the invention, the sunshade is adapted to at least partially cover a windshield of a vehicle. This configuration is advantageous in roof designs where the windshield extends comparatively far to the rear (e.g., as far back as over the heads of vehicle occupants seated on the front seats) by minimizing sun exposure through such a windshield to increase passenger comfort.

BRIEF DESCRIPTION OF THE DRAWINGS

The invention will now be described with reference to a preferred embodiment illustrated in the accompanying drawings, in which.

DETAILED DESCRIPTION OF THE EMBODIMENTS

Figure 1:
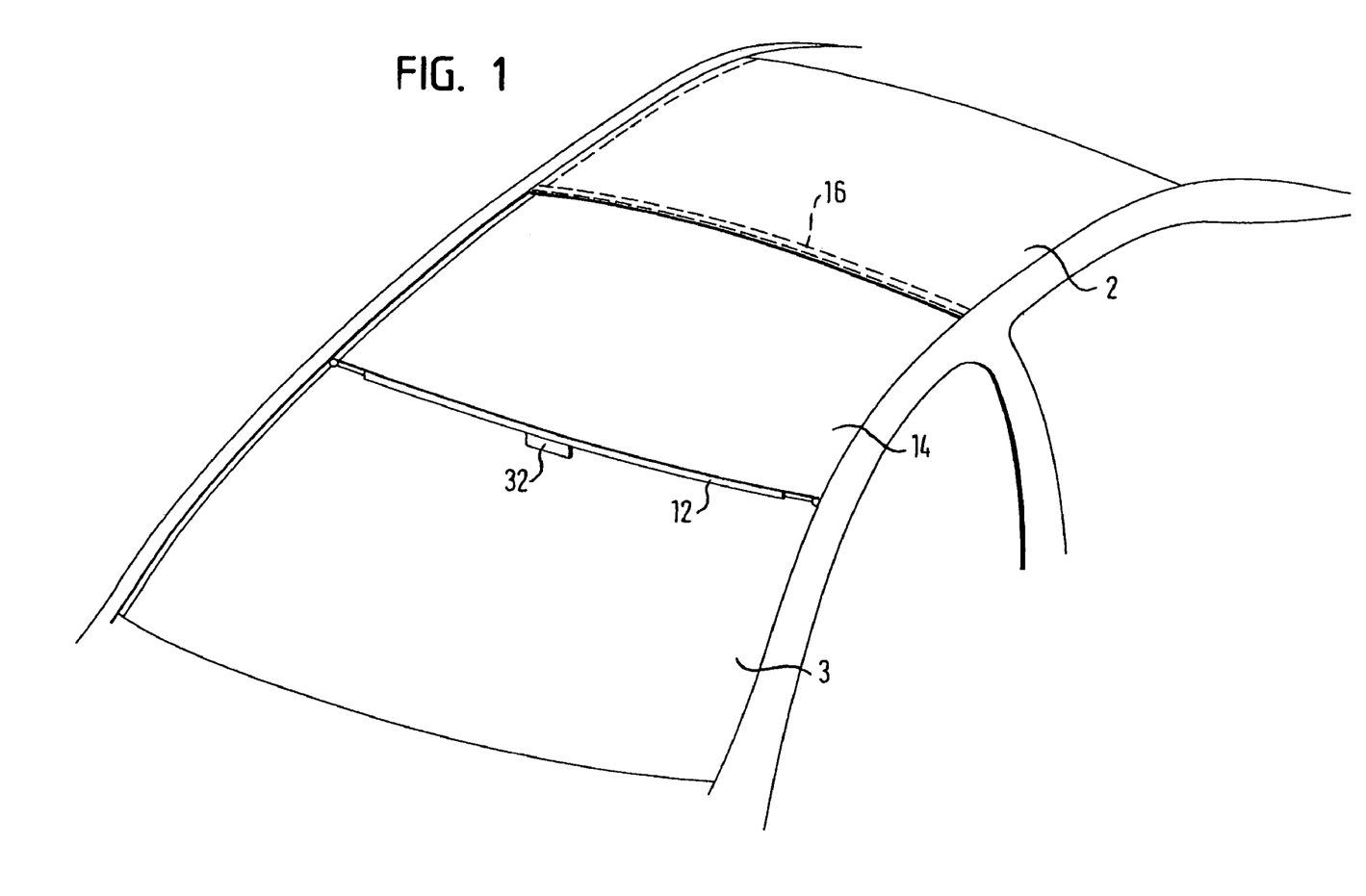
FIG. 1 is a perspective view of a vehicle roof including a sunshade system according to one embodiment of the invention, where the sunshade is pulled toward the front of the vehicle.
Figure 2:
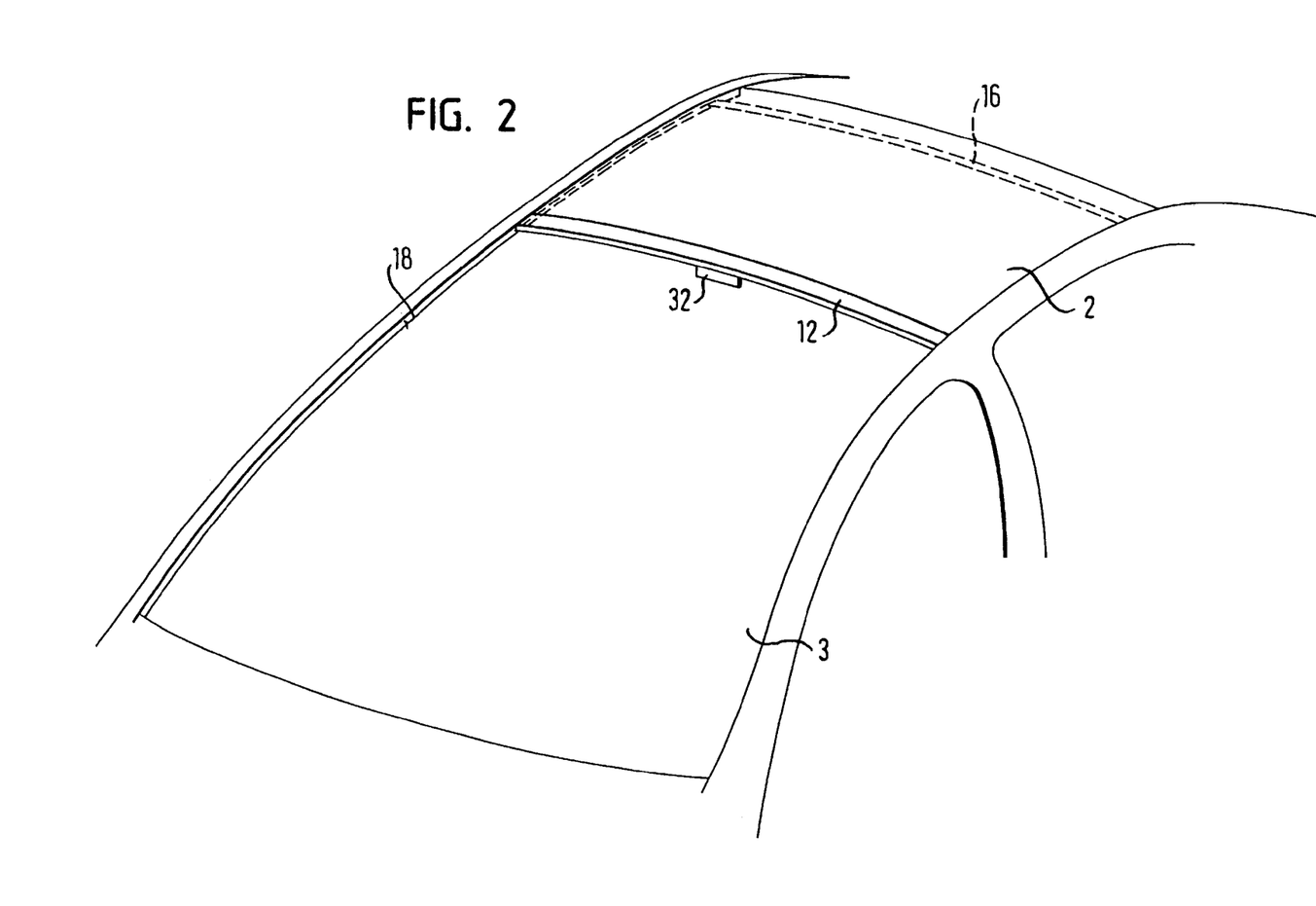
FIG. 2 shows the vehicle roof of FIG. 1 wherein the sunshade is pushed toward the rear of the vehicle.
Figure 3:
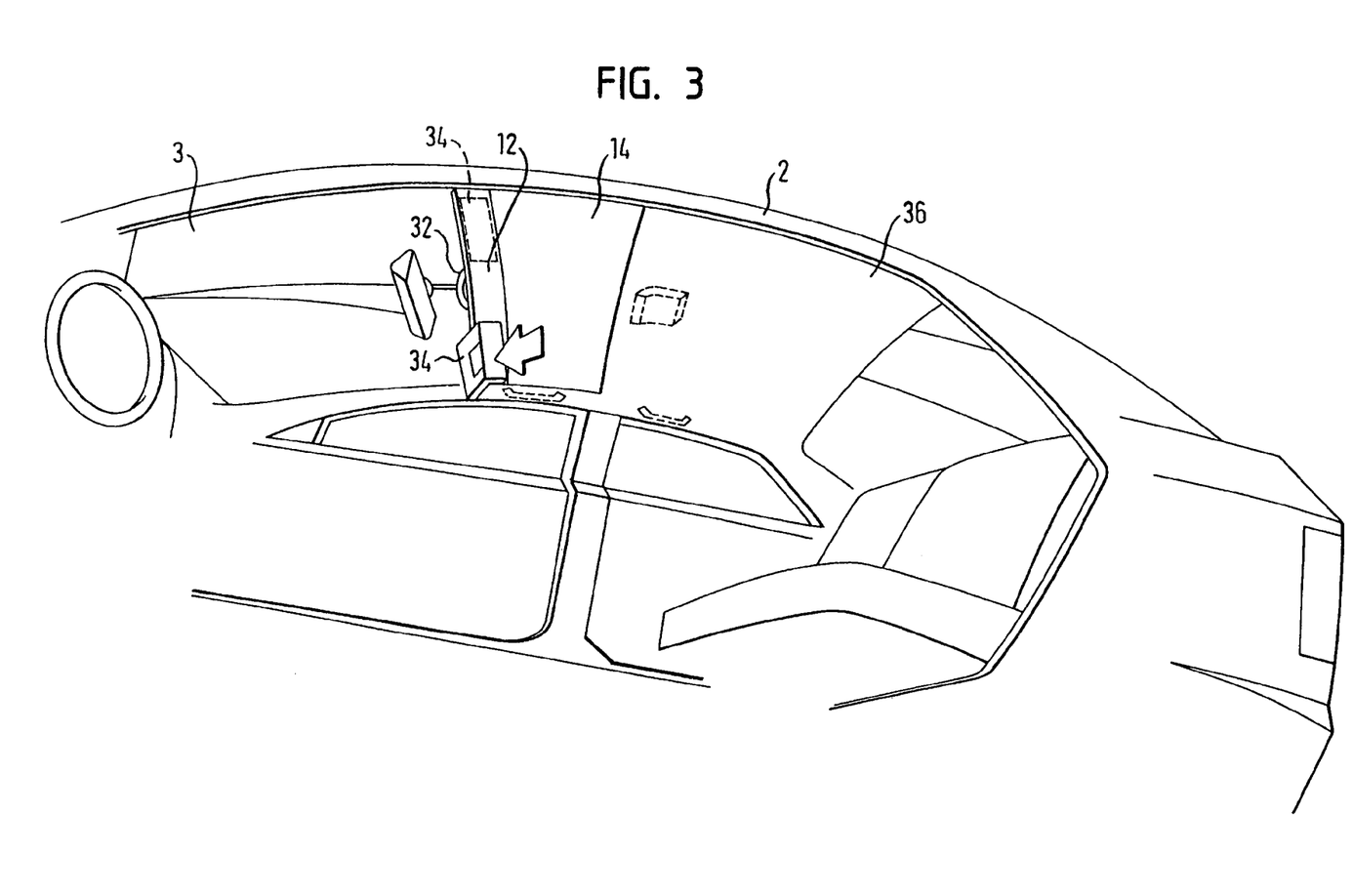
FIG. 3 shows a perspective view of the sunshade system in the installed condition, where the sunshade is partially pulled toward the front.
Figure 4:
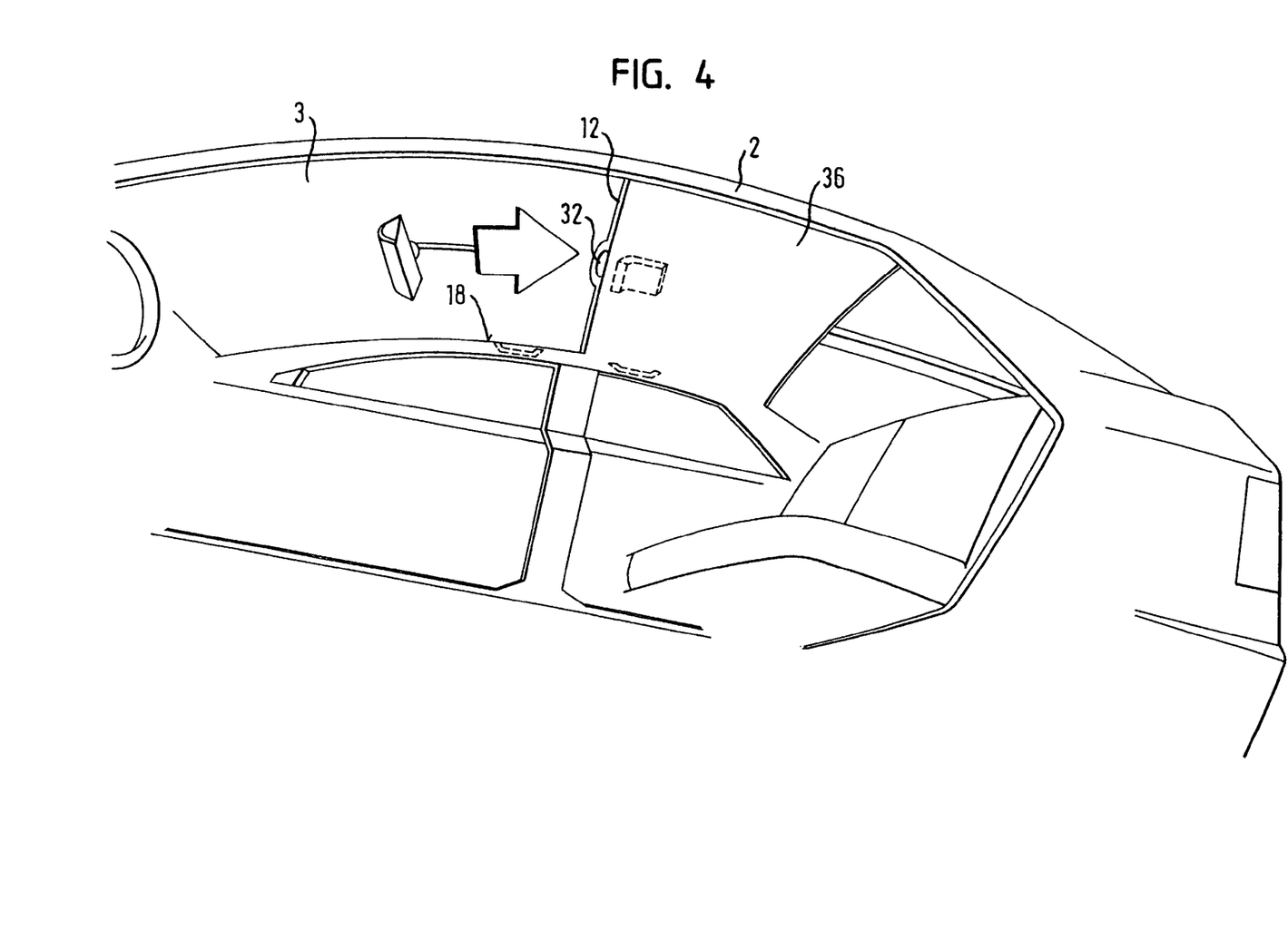
FIG. 4 is an illustration corresponding to that of FIG. 3, where the sunshade is pushed toward the rear.

Referring to FIG. 1 through 4, one embodiment of the inventive sunshade system is designed to be fitted to a vehicle roof 2 having a comparatively large windshield 3. As shown in FIGS. 2 and 4, the windshield 3 extends roughly as far as the B-column of the vehicle. In order to prevent any unwanted sunlight from entering the vehicle, the vehicle includes a sunshade system 10. For clarity, FIGS. 1 through 4 show only a front crossbar 12 and a sunshade 14 in the system 10. The sunshade 14 may be shifted between a pushed-back position, illustrated in FIGS. 2 and 4, and a pulled-forward position, shown in FIGS. 1 and 3.

When the sunshade 14 is pushed toward the rear of the vehicle, the front crossbar 12 is disposed in the area of transition between the windshield 3 and the opaque region of the vehicle roof 2, and the sunshade 14 is beneath the opaque region of the vehicle roof 2. When the sunshade 14 is pulled toward the front of the vehicle, the front crossbar 12 is pulled out to the front, as viewed in the direction of travel of the vehicle, so that it is located approximately in an area where, in a conventional vehicle, there would be a transition from the windshield to the vehicle roof. The sunshade 14 covers the area of the windshield that is located between the front crossbar 12 and the opaque region of the vehicle roof 2.

Figure 5:
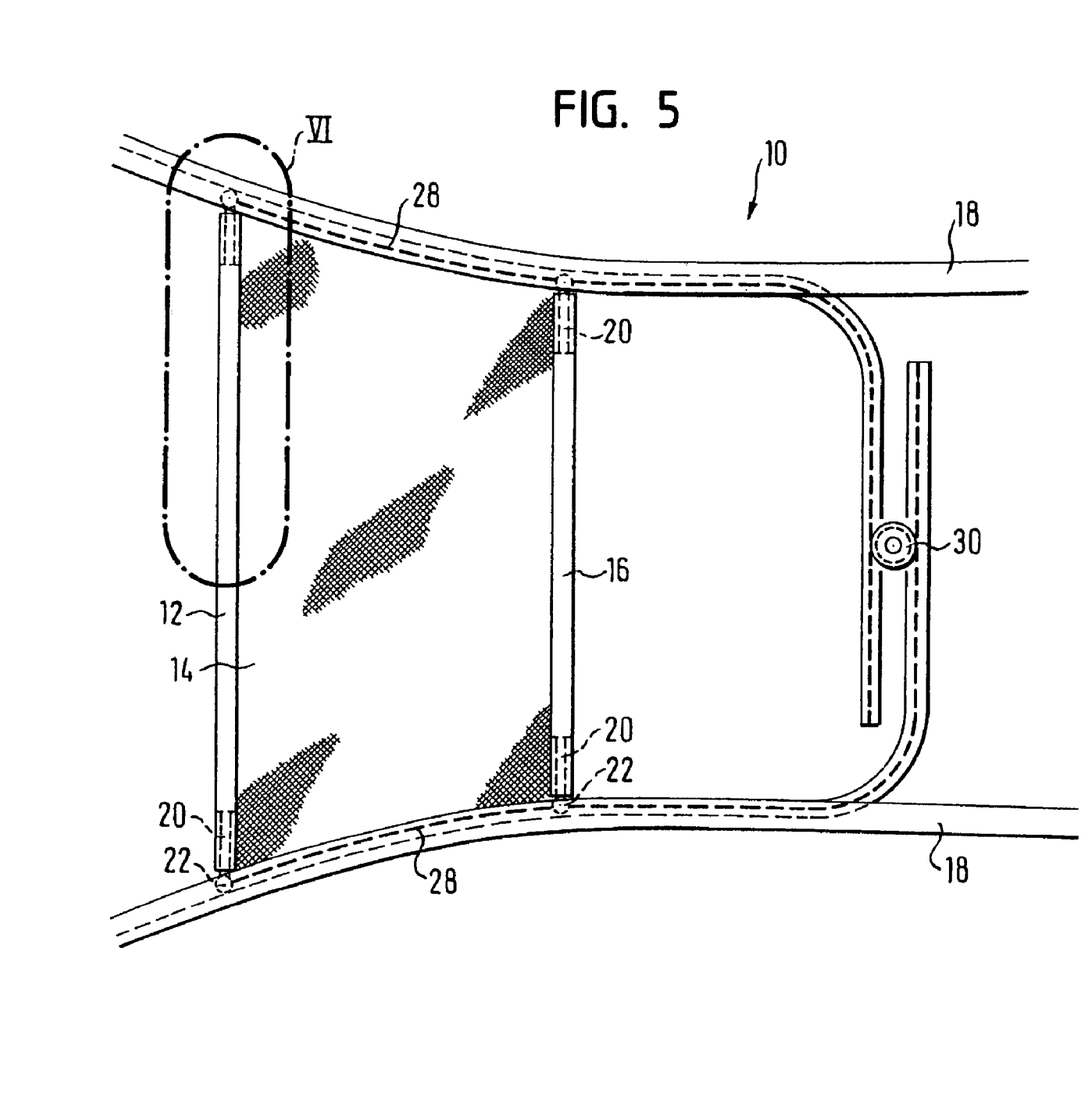
FIG. 5 is a diagrammatic top view of the sunshade system according to one embodiment of the invention.

FIG. 5 is a diagrammatic illustration of the sunshade system according to one embodiment of the invention. A rear crossbar 16 is fitted to the edge of the sunshade 14 opposite the front crossbar 12. The sunshade 14 is firmly connected to both the front crossbar 12 and the rear crossbar 16. The two crossbars 12, 16 are guided for sliding movement in a pair of guide rails 18. The two guide rails extend along the lateral edges of the roof 2 and along part of the lateral edges of the windshield 3. As may be seen in FIG. 5, the guide rails 18 do not run parallel to each other. As viewed in the direction of travel of the vehicle, the guide rails diverge at the front. This results from the fact that the distance between the two A-columns of a vehicle increases as viewed from the rear of the vehicle to the front. As can be seen in FIGS. 1 through 4, the two guide rails 18 may extend in a curved manner about the transverse axis of the vehicle because the vehicle roof and the windshield are curved in this direction.

Figure 6:
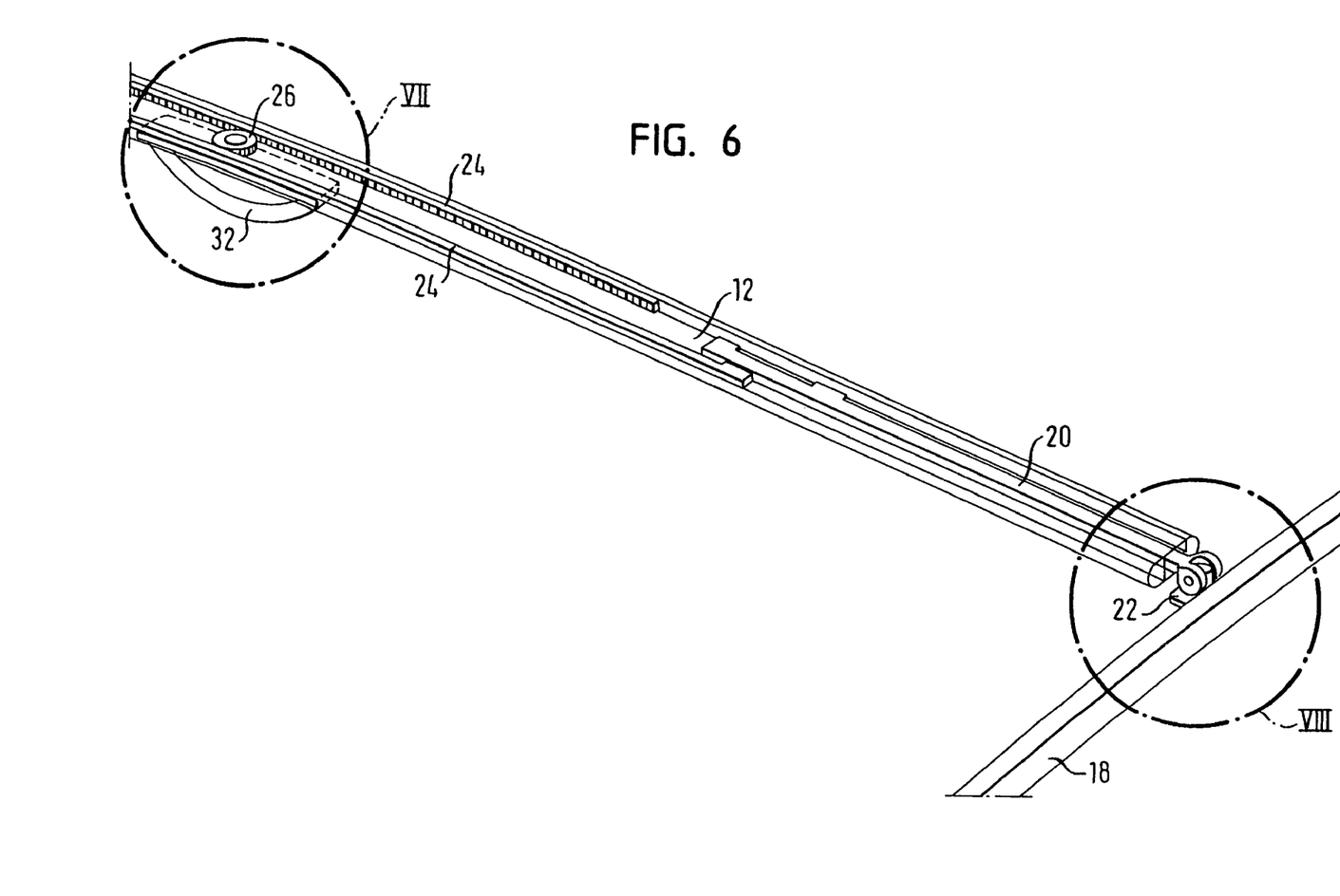
FIG. 6 shows the area VI of FIG. 5 on an enlarged scale.
Figure 7:
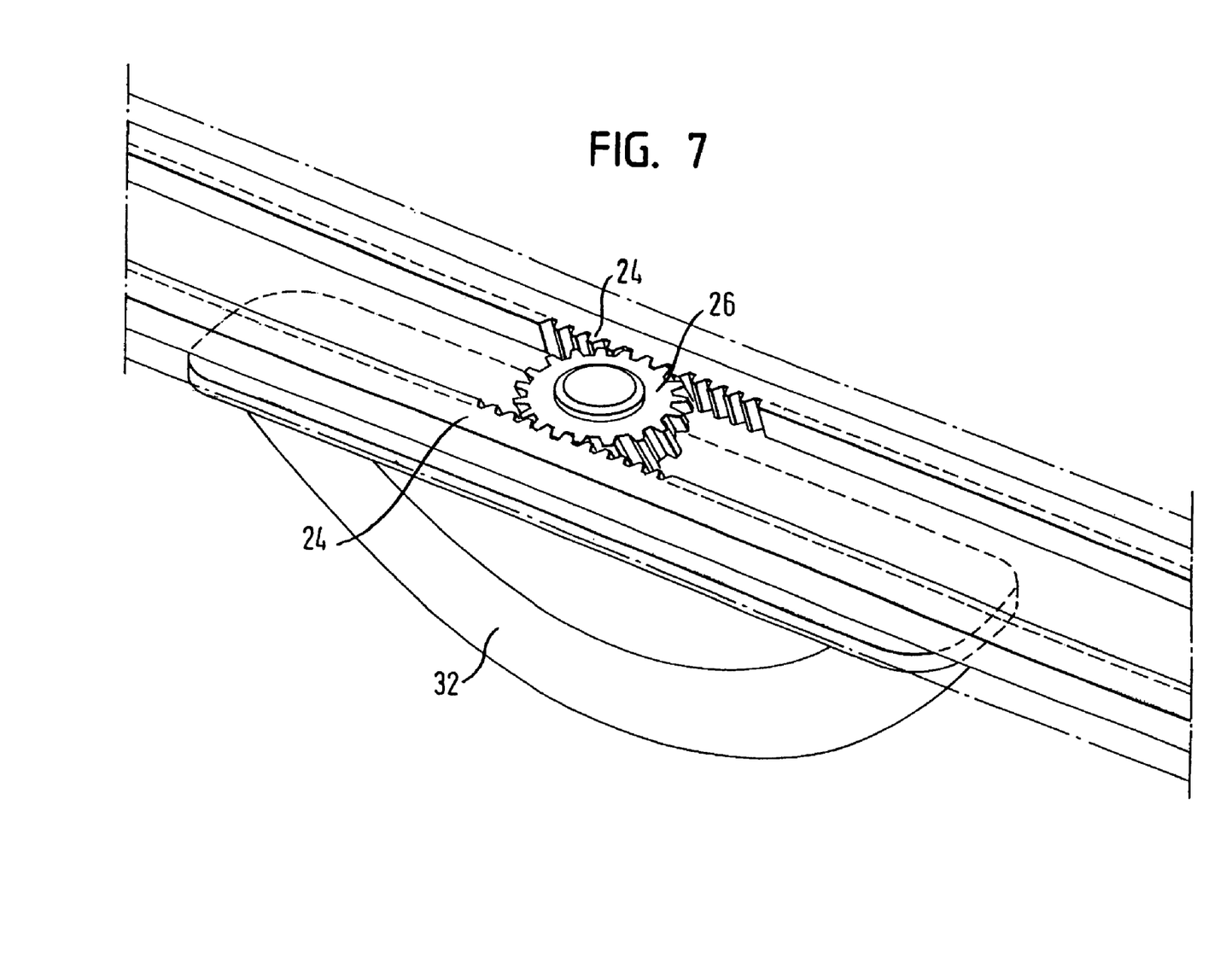
FIG. 7 shows the area VII of FIG. 6 on an enlarged scale.
Figure 8:
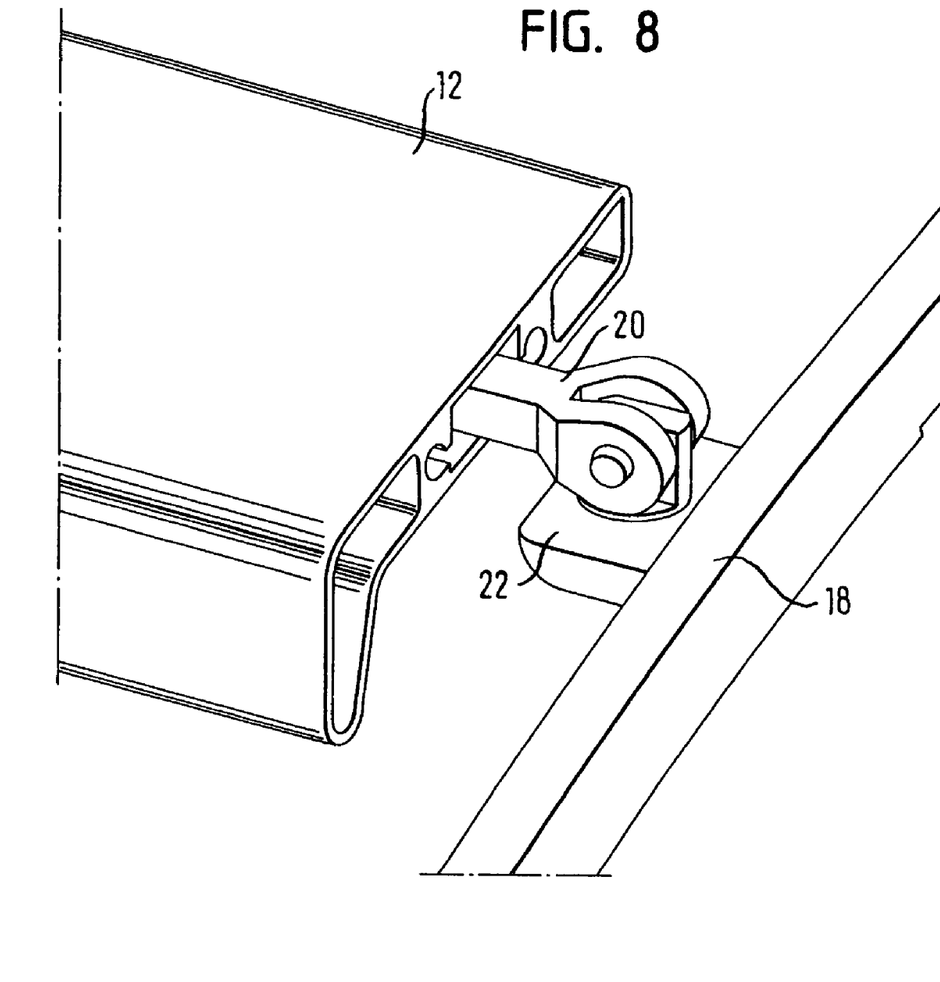
FIG. 8 shows the area VIII of FIG. 6 on an enlarged scale.

To balance the varying distance between the two guide rails 18, a guide arm 20 (FIG. 6) is provided at the end of each crossbar 12, 16. The guide arm 20 is received for sliding movement within each crossbar 12, 16. The free end of the guide arm 20 is connected to a slider 22 (FIG. 8) arranged for sliding movement within the respective guide rail. A tooth rack 24 is disposed at the end of each guide arm 20 received within the crossbar 12, 16 (FIG. 7) in engagement with a centering gear 26. The centering gear 26 is rotatably mounted at each crossbar 12, 16. The two tooth racks 24 of the two guide arms 20 engage the centering gear 26 on opposite sides with respect to the axis of rotation of the centering gear 26. This ensures that each crossbar 12, 16 is centered in the middle between the two guide rails 18.

The sunshade 14 extending between the two crossbars 12, 16 is laterally guided within the two guide rails 18. For this purpose, the sunshade 14 may have small sliding elements made of plastic molded onto its lateral edges, which are received in the profile of the guide rails 18. This structure is basically known from German Patent Application 197 39 919, for example.

To compensate for the varying distance between the two guide rails 18, the sunshade 14 is made of a material that is elastic at least in the transverse direction, such as, for example, a fabric material. A plastic material film having sufficient elasticity is also suitable. The elasticity of the material at substantially right angles to the shifting direction of the sunshade 14 ensures that the sunshade 14 will maintain coverage even as the distance between the guide rails 18 varies.

A spacer is provided between the front crossbar 12 and the rear crossbar 16 to provide a sufficient degree of pretensioning of the sunshade 14 in the longitudinal direction of the vehicle. In one embodiment, the spacer is formed by a push-pull cable 28 due to its flexible characteristics. The two cables 28 are received directly within the guide rails 18. In addition, because the sliders 22 of the two crossbars 12, 16 are molded onto the cables 28, they are firmly connected with the cables 28.

As shown in FIG. 5, the two cables 28 are routed to a location beyond the rear crossbar 16 and extend to reach a coupling gear 30 that is rotatably fitted to the vehicle roof 2. The two cables 28 engage the coupling gear on opposite sides of the coupling gear 30 so that the sections of the cables 28 received in the guide rails 18 can be shifted only parallel and jointly in the same direction, that is, both ends move either simultaneously forward or simultaneously backward. This prevents the crossbars 12, 16 connected with the cables from getting jammed between the guide rails 18.

Figure 9:
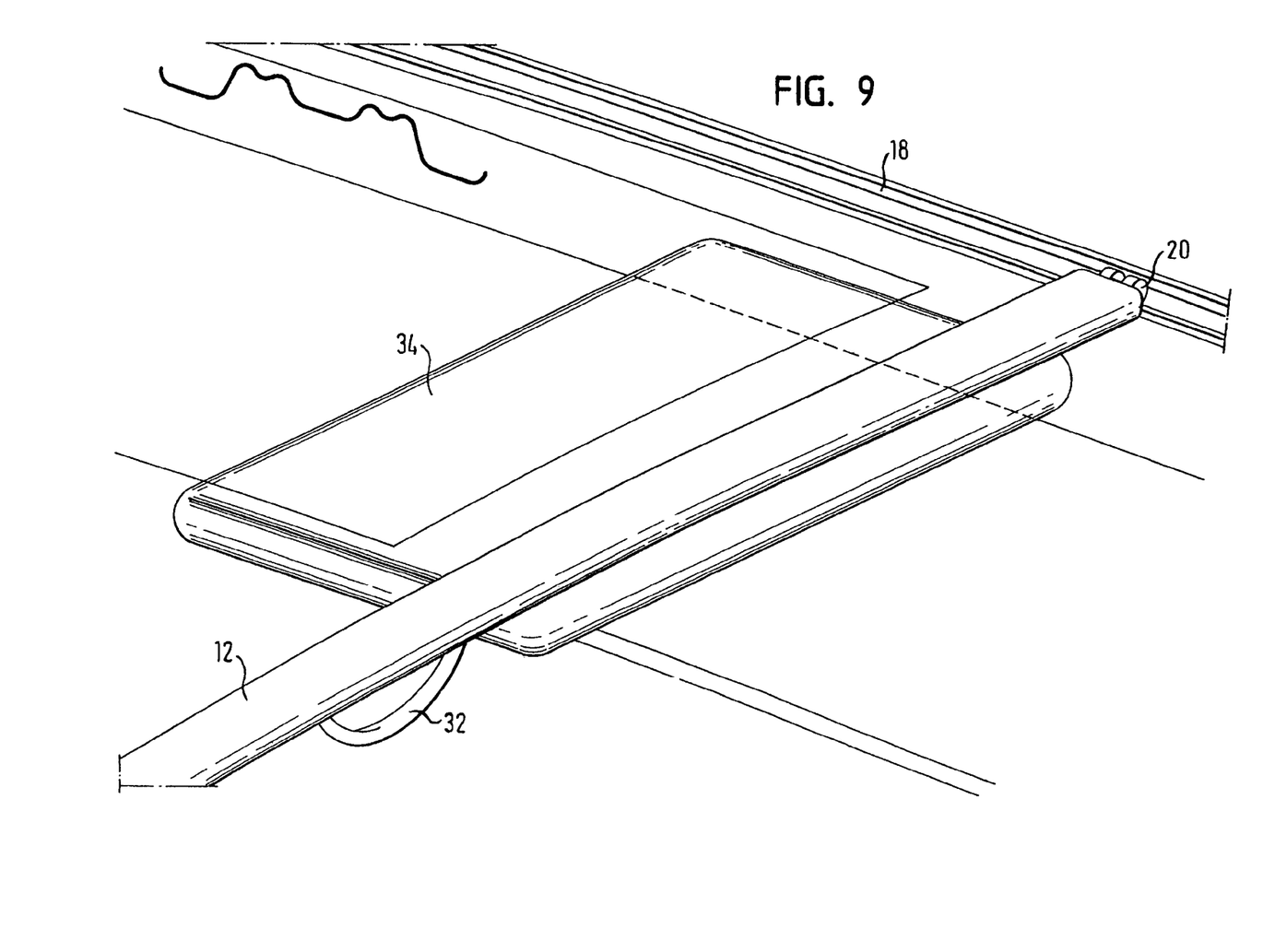
FIG. 9 is a diagrammatic view of a detail of the sunshade system.

FIG. 9 shows a handle 32 secured to the front crossbar 12. The handle 32 allows the front crossbar 12 to be shifted manually between the pushed-back and the pulled-forward positions. Furthermore, the two sun visors 34 may be fitted to the front crossbar 12 (FIG. 3) and may be folded down when the crossbar 12 has been pulled toward the front. When the front crossbar 12 is pushed completely toward the rear, the front crossbar 12, along with the sun visors 34, lies almost fully below the inside headliner of the vehicle roof so that it is concealed.

Figure 10:
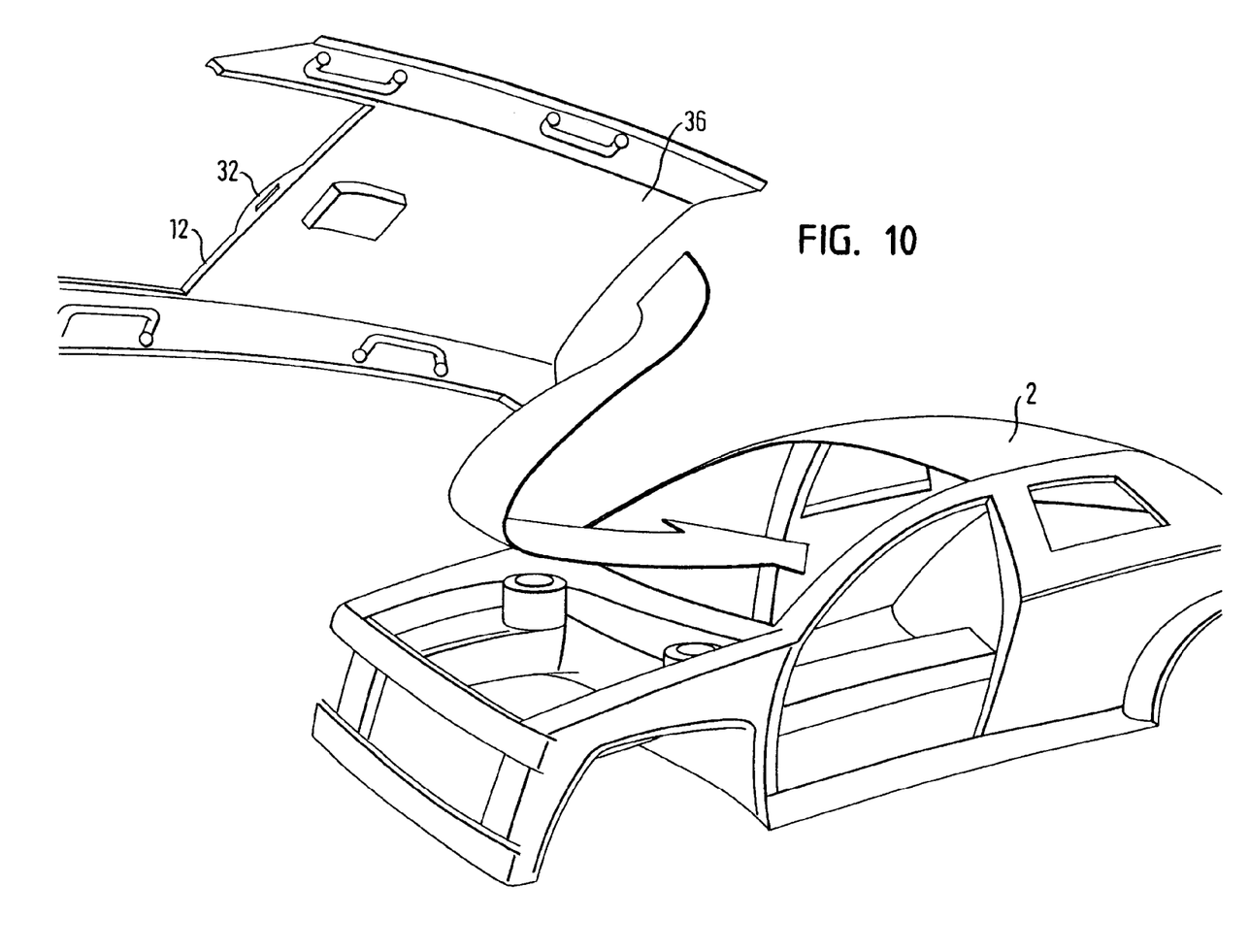
FIG. 10 is a perspective illustration of the installation of the sunshade system according to one embodiment of the invention.
Figure 11:
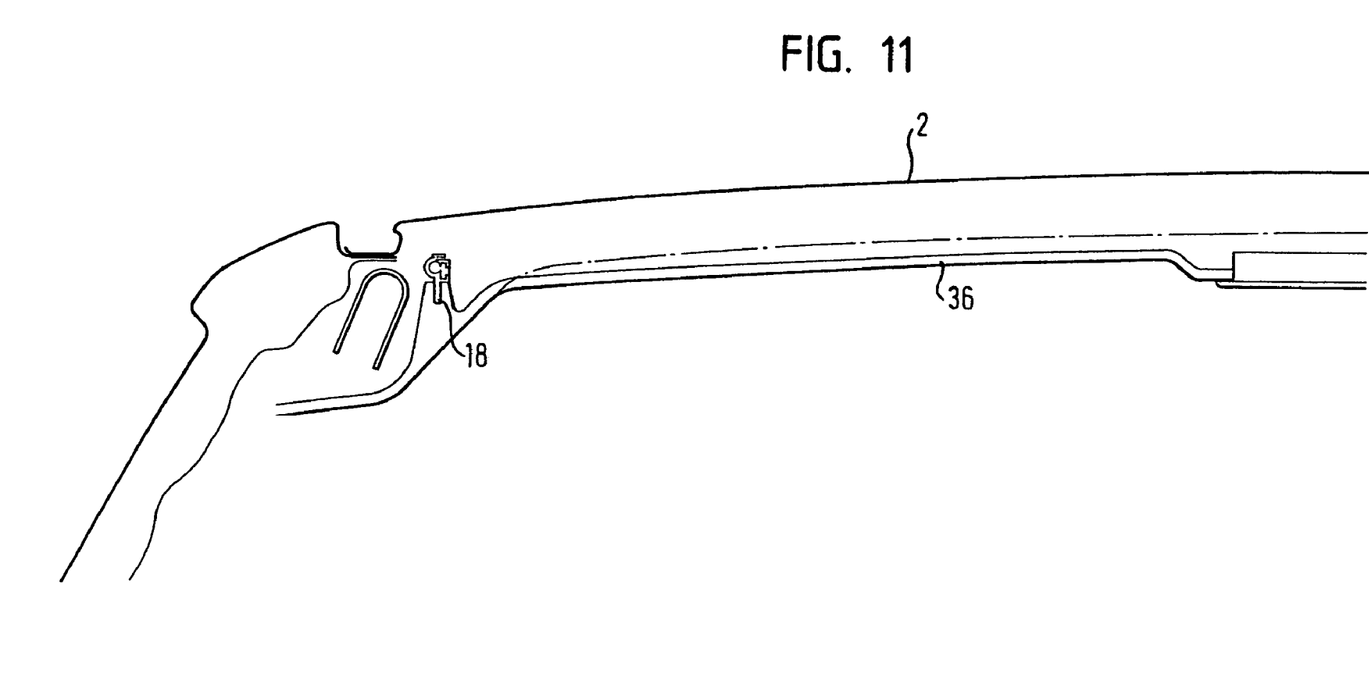
FIG. 11 diagrammatically shows a section through the vehicle roof of FIG. 1.

As shown in FIGS. 10 and 11, the sunshade system 10 may be mounted to a vehicle headliner 36 in advance to form a prefabricated unit that is then installed in the vehicle roof 2.

If it is desired for the sunshade 14 to be adjusted automatically, rather than manually by means of the handle 32, a drive motor may be provided to suitably act directly on the coupling gear 30.

Figure 12:
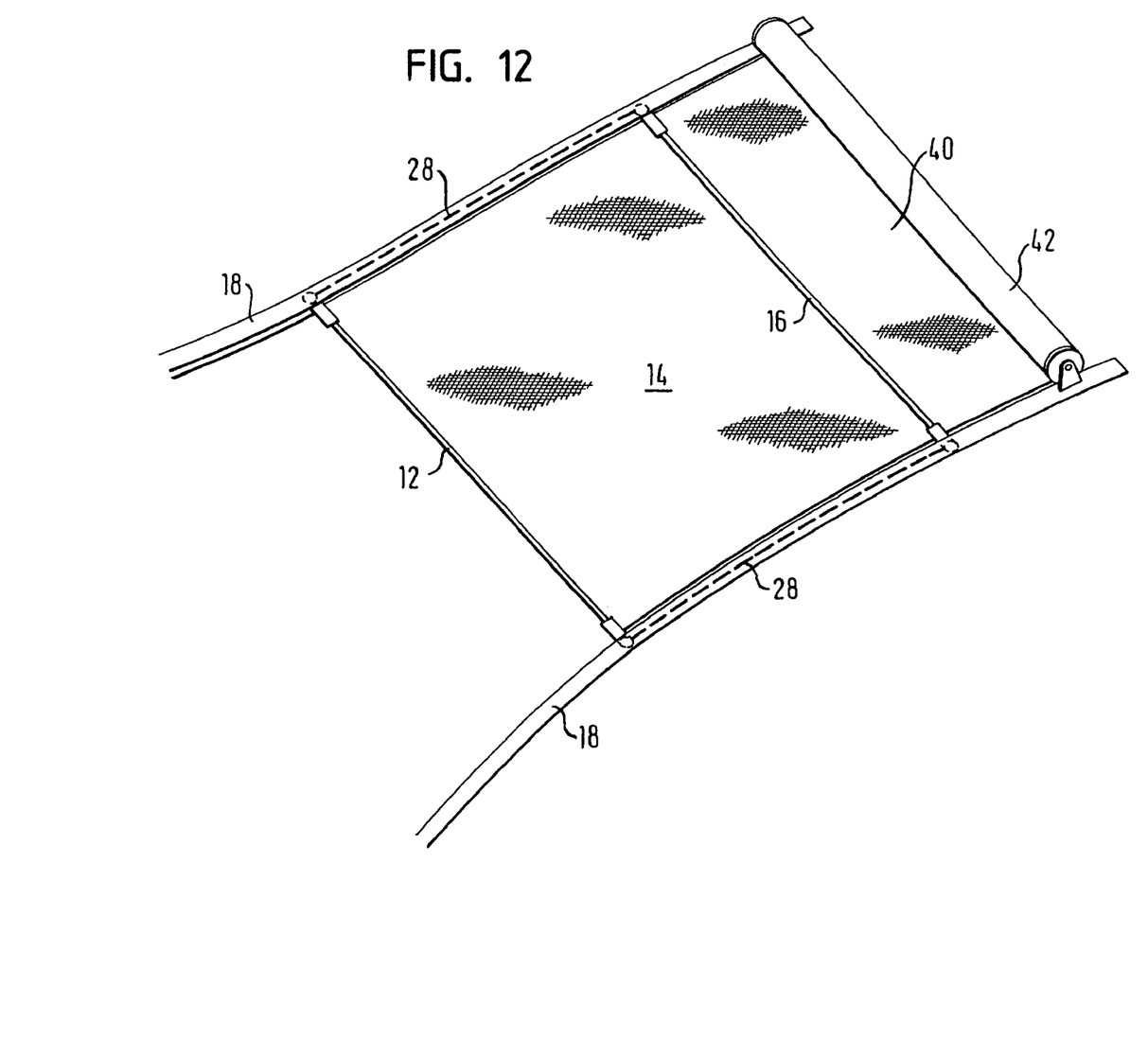
FIG. 12 is a diagrammatic view of a sunshade system according to a further embodiment of the invention.

FIG. 12 diagrammatically shows a sunshade system in accordance with a further embodiment of the invention. With respect to the front crossbar 12, the sunshade 14 and the rear crossbar 16, this embodiment is the same as the sunshade system described above. In this embodiment, however, a roller blind 40 is fitted to the rear crossbar 16. The roller blind 40 may be withdrawn from and coiled up on a coiling body 42 in a conventional fashion. The coiling body 42 is mounted for rotation and is spring-biased between the roof headliner and the shell.

Any desired material may be used for the roller blind 40 as long as it is suitable for winding up on the coiling body and also satisfies the particular design requirements for a given vehicle with respect to the desired shading from the light. The sunshade 14 may be made of the same material as the roller blind 40 or from some other material.

The most essential advantage of the embodiment shown in FIG. 12 is that the transparent roof area that can be shaded by the inventive sunshade system is larger than currently known sunshade systems. Because part of the sunshade is coiled up in a compact shape to form the roller blind, reducing the overall length of the sunshade system, the roof portion behind which the sunshade area between the crossbars is pushed may be made shorter. At the same time, there is no restriction in the headroom because the system only winds up the roller blind rather than the entire sunshade, resulting in a smaller diameter of the coiling roll.

A further difference from the embodiment illustrated in FIGS. 1 through 11 is that the roller blind 40 stabilizes and guides the rear crossbar 16 and, by means of the sunshade 14, the front crossbar 12 as well to such a degree that the need for any additional coupling of the two crossbars 12,16 (e.g., the coupling gear) is obviated. The roller blind 40 in the embodiment shown in FIG. 12 makes any jamming of the crossbars impossible.

It should be understood that various alternatives to the embodiments of the invention described herein may be employed in practicing the invention. It is intended that the following claims define the scope of the invention and that the method and apparatus within the scope of these claims and their equivalents be covered thereby.

The invention claimed is:

1. A sunshade system for a motor vehicle, comprising:
    first and second guide rails;
    a front crossbar and a rear crossbar that extend between the first and second guide rails and are guided in the first and second guide rails wherein at least one of the front crossbar and the rear crossbar is a telescopic member and wherein at least one of the front crossbar and the rear crossbar has first and second laterally protruding guide arms that are received in the at least one of the front cross bar and the rear crossbar for sliding movement therein, wherein the first laterally protruding guide arm is received in the first guide rail and the second laterally protruding guide arm is received in the second guide rail and wherein the first and second laterally protruding guide arms are mechanically coupled to each other and to the at least one of the front crossbar and the rear crossbar so that the at least one of the front crossbar and the rear crossbar is centered in a middle area between the first and second guide rails; and
    a flexible sunshade that is fastened to the front and rear crossbars, wherein the flexible sunshade is guided between the first and second guide rails.

2. The sunshade system as claimed in claim 1, wherein the first and second guide rails extend in an inclined relationship with respect to each other.

3. The sunshade system as claimed in claim 1, wherein the flexible sunshade is elastic at substantially right angles to a shifting direction dictated by the first and second guide rails.

4. The sunshade system as claimed in claim 2, wherein the flexible sunshade is entirely made of an elastic material.

5. The sunshade system as claimed in claim 1, further comprising a centering gear that centers the at least one of the front crossbar and rear crossbar in the middle area, wherein the centering gear is rotatably fitted to the at least one or the front crossbar and the rear crossbar and engages the at least one of the front crossbar and the rear crossbar by first and second tooth racks disposed on the first and second laterally protruding guide arms, respectively.

6. The sunshade system as claimed in claim 1, further comprising first and second sliders fitted in at least one of the front crossbar and rear crossbar and received in the first and second guide rails, respectively, for sliding movement therein.

7. The sunshade system as claimed in claim 1, further comprising a handle that is fitted to the front crossbar to allow manual adjustment of the flexible sunshade.

8. The sunshade system as claimed in claim 1, further comprising a sun visor that is fitted to the front crossbar such that the sun visor can be folded downward.

9. The sunshade system as claimed in claim 1, further comprising a spacer that engages the front and rear crossbars to keep the front and rear crossbars at a constant distance from each other.

10. The sunshade system as claimed in claim 9, wherein the spacer is at least one push-pull cable.

11. The sunshade system as claimed in claim 10, wherein the first guide rail has a first cable disposed therein and the second guide rail has a second cable disposed therein, the first and second cables acting as the spacer, wherein the first and second cables are coupled with each other such that ends of the first and second cables associated with the front and rear crossbars can only be shifted jointly and in parallel.

12. The sunshade system as claimed in claim 11, further comprising a coupling gear tat cooperates with the first and second cables.

13. The sunshade system as claimed in claim 12, further comprising a drive motor that engages the coupling gear.

14. The sunshade system as claimed in claim 10, further comprising first and second sliders molded onto the at least one push-pull cable, fitted in at least one of the front crossbar and rear crossbar and received in the first and second guide rails, respectively, for sliding movement therein.

15. The sunshade system as claimed in claim 1, wherein the flexible sunshade is adapted to at least partially cover a windshield of a vehicle.

16. The sunshade system as claimed in claim 15, wherein the first and second guide rails are part of a roof opener system.

17. The sunshade system as claimed in claim 1, further comprising a roller blind that is secured to the rear crossbar.

18. The sunshade system as claimed in claim 17, further comprising a coiling body, wherein the roller blind is wound on the coiling body.

19. The sunshade system as claimed in claim 1, wherein the flexible sunshade is made from a resilient material extending in a longitudinal direction between the front and rear crossbars, the resilient material being resilient at least in a direction transverse to the longitudinal direction.

* * * * *